(12) United States Patent
Langhammer

(10) Patent No.: US 8,300,805 B1
(45) Date of Patent: Oct. 30, 2012

(54) AES CORE WITH INDEPENDENT INPUTS AND OUTPUTS

(75) Inventor: Martin Langhammer, Wiltshire (GB)

(73) Assignee: Altera Corporation, San Jose, CA (US)

( * ) Notice: Subject to any disclaimer, the term of this patent is extended or adjusted under 35 U.S.C. 154(b) by 1420 days.

(21) Appl. No.: 11/650,248

(22) Filed: Jan. 4, 2007

(51) Int. Cl.
*H04K 1/00* (2006.01)

(52) U.S. Cl. .......................... 380/28; 380/37

(58) Field of Classification Search .............. 713/150, 713/182, 375; 714/38, 49, 48, 35, 37; 709/203, 709/217, 223, 237, 225, 229, 227; 726/22, 726/14, 13, 11, 34, 25, 26, 27; 380/42, 55, 380/58, 46
See application file for complete search history.

(56) References Cited

U.S. PATENT DOCUMENTS

| | | | |
|---|---|---|---|
| 7,570,760 B1 * | 8/2009 | Olson et al. | 380/37 |
| 7,620,821 B1 * | 11/2009 | Grohoski et al. | 713/189 |
| 2007/0286416 A1 * | 12/2007 | Bertoni et al. | 380/37 |

OTHER PUBLICATIONS

"Announcing the Advanced Encryption Standard (AES)", Federal Information Processing Standards Publication 197, Nov. 26, 2001, 51 pages.
Daemen, J., et al., "AES Proposal: Rijndael", The Rijndael Block Cipher AES Proposal, Document version 2, Mar. 9, 1999, 45 pages.

* cited by examiner

*Primary Examiner* — Jeffrey Pwu
*Assistant Examiner* — Nega Woldemariam
(74) *Attorney, Agent, or Firm* — Weaver Austin Villeneuve and Sampson LLP

(57) ABSTRACT

Encrypting data using the Advanced Encryption Standard (AES) algorithm uses pipelined registers to perform the AES processing. Any number of registers (two or more) each holds a block of plaintext data. A multiplexer accepts one block of data at a time and feeds it into the pipeline processing unit. The processing unit performs a round of encryption upon the block. A key round generator generates a set of round keys for the pipeline processing unit using a cipher key and the set of round keys are stored in parallel in memory devices, each memory device corresponding to one of the registers. The pipeline processing unit receives the correct round key for each round of encryption from the memory device corresponding to the block of data being encrypted by the add round key unit at that time. A read counter (one per register) indexes one of the round keys in the appropriate memory device thus enabling the indexed round key to be input to the pipeline processing unit for the appropriate round and block.

39 Claims, 5 Drawing Sheets

State Array Input and Output

AES Core Timing

| Time Slot for Block N | Block 1 | Block 2 | Block 3 | Block 4 | Block 1 | ... | | | | | | | | | | | |
|---|---|---|---|---|---|---|---|---|---|---|---|---|---|---|---|---|---|
| Start Counter | 0 | 1 | 2 | 3 | 0 | | 1 | 2 | 3 | 0 | 1 | 2 | 3 | 0 | 1 | 2 | 3 |
| Main Counter | 0 | 1 | 2 | 3 | 4 | | 5 | 6 | 7 | 8 | 9 | 10 | 11 | 12 | 13 | 14 | 15 |
| Key Round | 0 | | | | 1 | | | | 2 | | | | 3 | | | | |

FIG. 5

AES CORE WITH INDEPENDENT INPUTS AND OUTPUTS

FIELD OF THE INVENTION

The present invention relates generally to cryptography. More specifically, the present invention relates to a hardware core architecture for the Advanced Encryption Standard (AES).

BACKGROUND OF THE INVENTION

The Data Encryption Standard (DES) has been an encryption standard used by the United States federal government for many years. Recently, however, faster computers and better algorithms have caused concern that DES might easily be cracked; therefore, a more secure standard was desired.

The search for a replacement to DES started in January 1997 when the National Institute of Standards and Technology (NIST) announced that it was looking for an Advanced Encryption Standard. In October 2000, NIST announced their selection: the Rijndael algorithm developed by Joan Daemen and Vincent Rijmen of Belgium.

The Advanced Encryption Standard (AES) algorithm is a version of the Rijndael algorithm. The AES algorithm is a cryptographic algorithm that can be used to protect electronic data. The AES algorithm is a symmetric block cipher that can encrypt (encipher) and decrypt (decipher) information. Encryption converts data to an unintelligible form called ciphertext; decrypting the ciphertext converts the data back into its original form, called plaintext. The AES algorithm is capable of using cryptographic keys of 128, 192 and 256 bits to encrypt and decrypt data in blocks of 128 bits. The document *Announcing the Advanced Encryption Standard (AES)* published as the Federal Information Processing Standards Publication 197 on Nov. 26, 2001 is hereby incorporated by reference. The Rijndael proposal, *AES Proposal: Rijndael*, version 2, dated Mar. 9, 1999 is also hereby incorporated by reference.

Although the Rijndael algorithm is written in such a way that block length or key length can easily be extended in multiples of 32-bits (for example block sizes of 128, 192 or 256 bits), the AES algorithm only specifies a 128-bit block size and the key sizes given above. The AES algorithm is specifically designed for efficient implementation in hardware or software on a range of processors. Although software implementation of the AES algorithm is relatively easy, the processing time is slower. Thus, many high-speed implementations of the AES algorithm focus on a hardware design.

For example, many hardware implementations use pipelining and/or unrolling to speed up the processing of the algorithm. But, while pipelining and/or unrolling certain cryptographic algorithms makes for an easier-to-route, higher-performance hardware core with a small area, it often makes the interface timing very restrictive.

But, the input and output words of these previous methods need to interface to the hardware core within a fixed time. This inflexibility makes these hardware cores very difficult to use, and in some cases, results in a larger system than if discrete hardware cores for each individual encryption operation had been used.

Therefore, an improved hardware implementation of the AES algorithm is desired that has none of the inflexibility of these previous methods.

SUMMARY OF THE INVENTION

To achieve the foregoing, and in accordance with the purpose of the present invention, and AES core architecture is disclosed that uses independent input and output times.

One advantage of the present invention is that a single key round generator is used to generate all of the round keys used by the algorithm. A controller then dynamically assigns the correct round key to the block currently being processed through the use of a series of parallel memory devices. The next available plaintext block of data may be loaded into the core architecture whenever it is ready and the controller does not allow that particular plaintext block to be processed until the correct time slot is ready, so that the correct round key will be applied to that block. Thus, the core architecture is not limited to a plaintext block being loaded at any particular point in time. Therefore, plaintext blocks that arrive staggered or delayed with no predictability can be loaded when available. Further, a subsequent plaintext block may be loaded into the core architecture before the previous blocks have finished being encrypted.

The present invention provides a hardware core that allows the interface timing for pipelined AES cryptographic algorithms to be as flexible as if a separate core were encrypting one block at a time. The invention offers all the routing, size and speed advantages of typical AES core architectures, while also providing completely independent input and output times. The applicability of the technique is broader than simply hardware cores; the technique also applies to real-time applications, data, programming output files and devices such as ASICs and disk drives.

BRIEF DESCRIPTION OF THE DRAWINGS

The invention, together with further advantages thereof, may best be understood by reference to the following description taken in conjunction with the accompanying drawings in which:

FIG. 5 illustrates AES core architecture timing for a specific example.

DETAILED DESCRIPTION OF THE INVENTION

As is known in the art, the Advanced Encryption Standard (AES) is a symmetric 128-bit block data encryption algorithm that has been adopted by the U.S. government. The AES algorithm is an iterated block cipher, meaning that the initial input block undergoes multiple rounds of transformation before producing the output. Each intermediate block is called a State.

Figure 1:
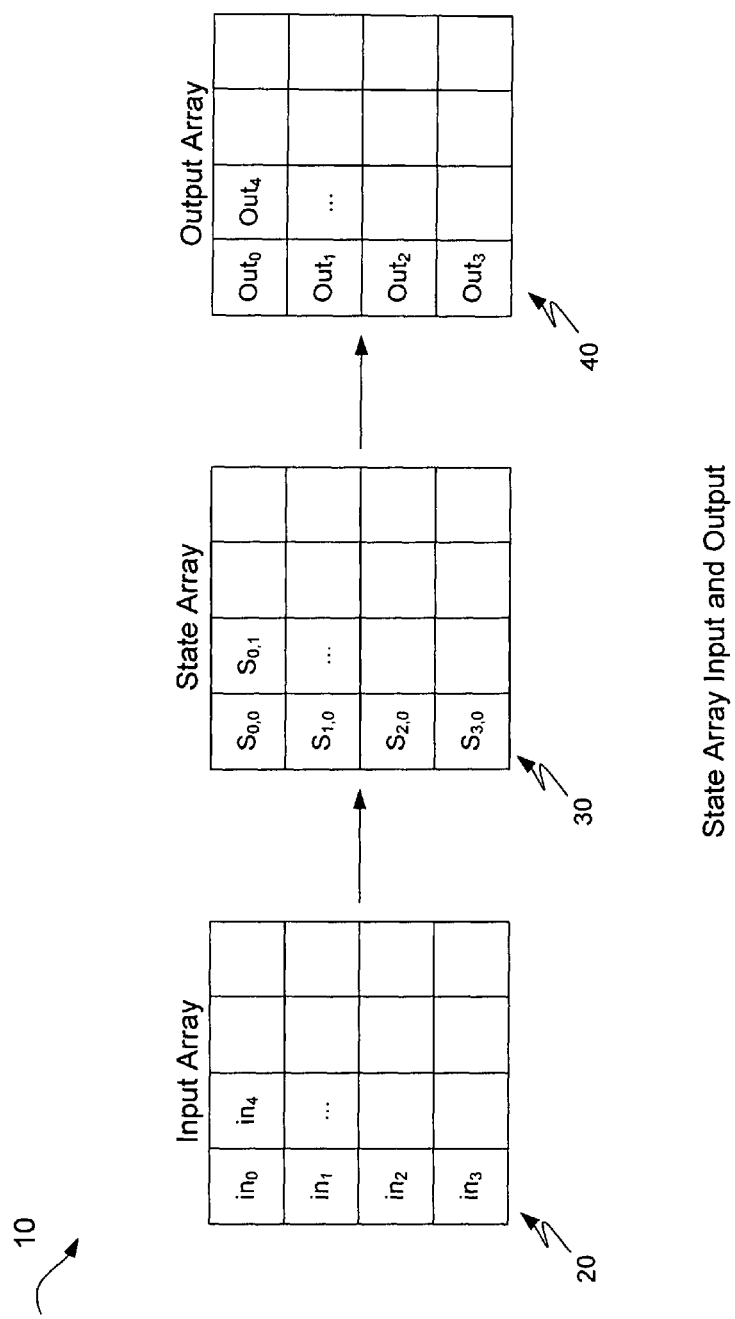
FIG. 1 illustrates how an input block is processed using the State.

FIG. 1 illustrates how an input block 20 is processed using the State 30. As shown, the State 30 (and the input and output blocks 20 and 40) can be represented as a two-dimensional array of bytes. The state includes four rows of bytes, each row containing four bytes (when the block length is 128 bits). At the start of the cipher (or the inverse cipher) the input array of bytes is copied into the State array. The cipher (or inverse cipher) operations are then conducted on this State array (with intermediate results being stored in the state), after which its final value is copied to the output array of bytes. The cipher key may also be represented as an array of bytes, the array having 4 rows and 4, 6 or 8 columns corresponding to a 128-bit, a 192-bit or a 256-bit cipher key, respectively.

Additionally, the four bytes in each column of the State array form 32-bit words, each word including four bytes. In this sense, the State can be interpreted as a one-dimensional array of 32-bit words (or columns) where the column number indicates the particular word in question. The number of transformation rounds performed upon each block in the State is a function of the key length. For a key size of 128 bits, 10 rounds are performed, for a key size of 192 bits 12 rounds are performed, and for a key size of 256 bits 14 rounds are performed. Under the original Rijndael algorithm, larger block sizes may have different numbers of rounds used for different key sizes.

Each round typically includes four transformation steps. A regular round includes a "substitute bytes" transformation, a "shift rows" transformation, a "mix columns" transformation, and an "add round key" transformation. In the example where 10 rounds are required, there is a pre-round that includes only the "add round key" transformation, followed by 9 regular rounds, and then a final round including only the "substitute bytes," "shift rows," and "add round key" transformations.

AES Core Architecture

Figure 2:
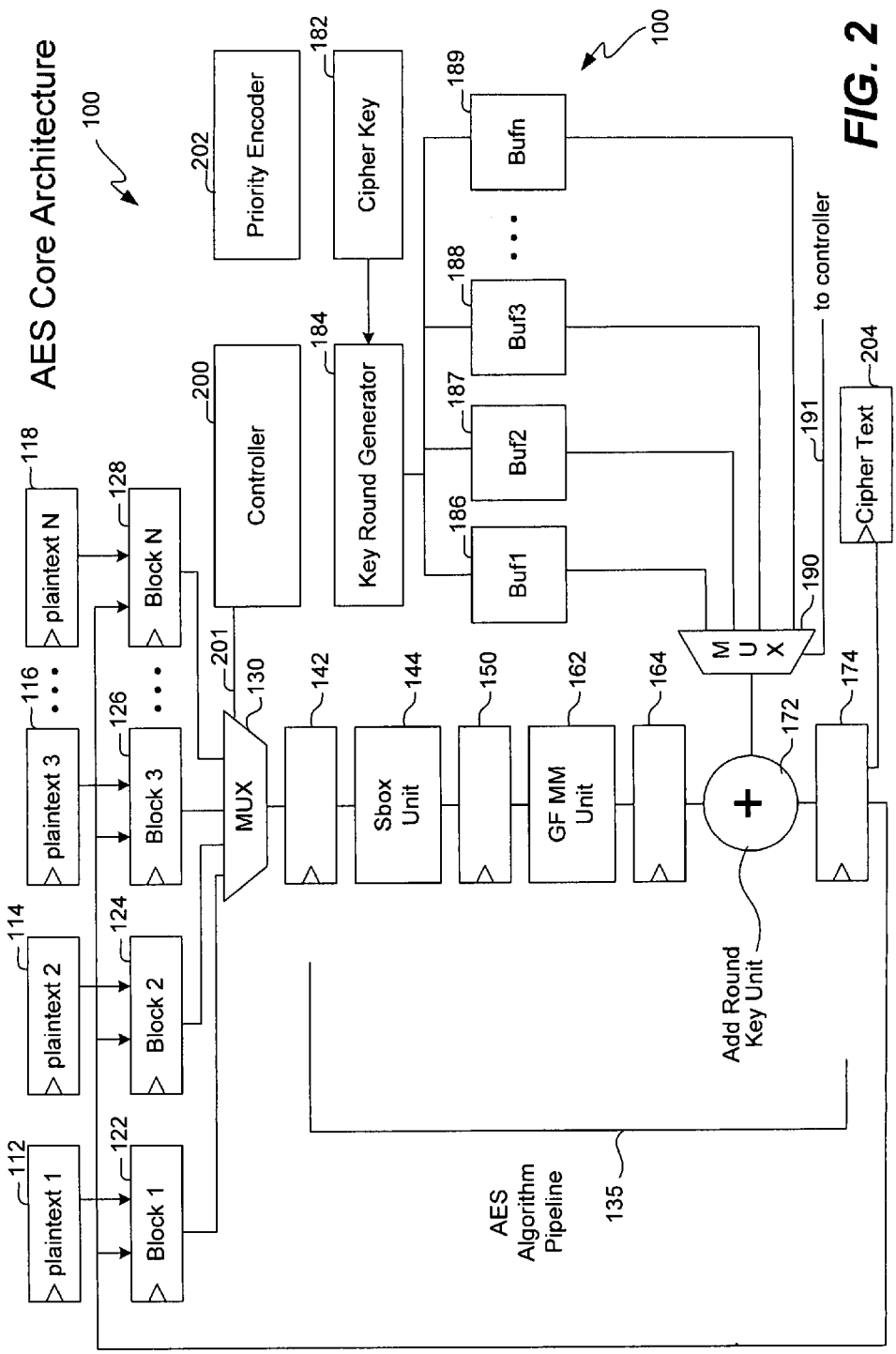
FIG. 2 is a block diagram of a general AES core architecture according to one embodiment of the invention.

FIG. 2 is a block diagram of an AES core architecture 100 according to one embodiment of the invention. FIG. 2 illustrates the general case where there are N blocks of data to be encrypted, indexed 0 to N−1. Shown is plaintext input data 112-118, the core architecture itself 122-210, and a pipeline register 174 that also serves to output the ciphertext 204.

The plaintext to be encrypted by the AES core may be delivered to the core in any suitable fashion. For example, as shown, plaintext blocks (data blocks of 128 bits) are input into registers 122-128. Alternatively, the input plaintext blocks may originate from a single bus or source and may be input to any of the registers 122-128 when available as explained below. Registers 122-128 are any suitable hardware register for holding a block of data. When initially loaded, each register holds the original plaintext block, but as encryption is performed on the block under the AES algorithm, each register will hold the block in an intermediate encryption stage. Multiplexer 130 controls the delivery of each block in turn into the AES algorithm pipeline 135. The controller selects the multiplexer input depending on the time slot using a signal 201. Register 142 is a pipeline register holding a block before delivery to S-Box unit 144. S-Box unit 144 is a hardware-implemented unit that performs the "substitute bytes" transformation ("SubBytes") upon a given block. One of skill in the art familiar with the AES algorithm will be able to implement such a unit in hardware. For example, one hardware implementation technique implements the unit using a look up table, either using ROM memories or synthesized logic.

The second transformation, the shift rows transformation ("ShiftRows") may be implemented through the wire connections between register 142 and unit 144, or through the connections between unit 144 and register 150. As this relatively simple transformation merely shifts rows in the state, one of skill in the art familiar with the AES algorithm will be able to implement such a transformation in hardware with no trouble.

Register 150 is a pipeline register holding the output of unit 144 before delivery to unit 162. Galois field multiplication unit 162 is a hardware-implemented unit that performs the "mix columns" transformation ("MixColumns") upon a given block. One of skill in the art familiar with the AES algorithm will be able to implement such a unit in hardware. For example, one hardware implementation technique implements the unit using a network of shifts and xors.

Register 164 is a pipeline register holding the output of unit 162 before delivery to unit 172. Add round key unit 172 is a hardware-implemented unit that performs the "add round key" transformation ("AddRoundKey") upon a given block. Also input to unit 172 is the appropriate round key for the current round via multiplexer 190. One of skill in the art familiar with the AES algorithm will be able to implement such a unit 172 in hardware. For example, one hardware implementation technique implements the unit using block-wide xor logic.

Also included within AES core architecture 100 is a controller 200, a priority encoder 202, a priority encoder, and a multiplexer; these devices and their connections to the architecture will be explained in greater detail below. Key round generator 184 is a hardware-implemented unit that performs the key expansion routine of the AES algorithm. Basically, the key round generator takes the cipher key 182 and performs the key expansion routine to generate a key schedule. The key round generator generates 11 different round keys in the case where 10 rounds are required (one additional round key is required for an initial round key addition transformation). One of skill in the art familiar with the AES algorithm will be able to implement such a key round generator in hardware. For example, one hardware implementation technique implements the key expansion of the generator as follows. Key expansion includes a rotation of bytes in a subset of the key, "SubBytes," a sequential xoring of words in the key, and a possible addition of a variable to one of the bytes.

Buffers 186-189 are any suitable buffer for holding the round keys. For example, buffers 186-189 are simple dual-port RAMs. They can also all be replaced by a single multi-port RAM with one write port and N read ports, but as this will be expensive or unavailable in many technologies, the present description contemplates implementation on multiple parallel RAMs. FPGAs are rich in dual-port RAMs. Buffers 186-189 may also be circular buffers. The key round generator outputs each of these 11 round keys in parallel to these memories as explained below using a write address counter of controller 200. As explained below, a read counter for each memory is used to control which round key of each buffer is input to multiplexer 190. Multiplexer 190 is controlled by controller 200 using signal 191. There are N key-space storage memories 186-189, one for each block.

Another way to implement the key space memories 186-189 is to use a single memory, for example, a simple dual port memory. As any key read for a particular block will only occur once per round, and this key read will be for a unique time slot corresponding to that particular block, the read counters may be multiplexed into the read address of a single memory. The priority encoding scheme described here will ensure that a valid key will be read by any access, even if the key is changed (in accordance with the described invention).

Output from unit 172 is held in pipeline register 174. If a particular block (for example, block 122) has not finished being encrypted, i.e., not all 11 rounds have finished, then that block in its intermediate encrypted form is placed again into its appropriate register (for example, returned to register 122) for further encryption processing. If block 2, for example, is in its intermediate form and arrives at register 174, it would be reloaded into register 126 to complete its encryption processing. The controller controls into which register 122-128 a current block (such as block 2) will be reloaded using the time slot. That is, the correct time slot will be read as timeslot-1 (modulo N). For example, if block 0 is started in time slot 0, block 1 in timeslot 1 ... block 3 in timeslot 3, then a write back (reload) to block0 is timeslot 3, block 1 is timeslot 0 ... block3 in timeslot 2.

Once all rounds have been completed for a particular block and upon a suitable "DONE" signal 470 from controller 200, the resulting ciphertext block 204 is latched from register 174 and represents an encrypted plaintext block under the AES algorithm. A user or external device is then apprised that the ciphertext block is available for output.

Figure 3:
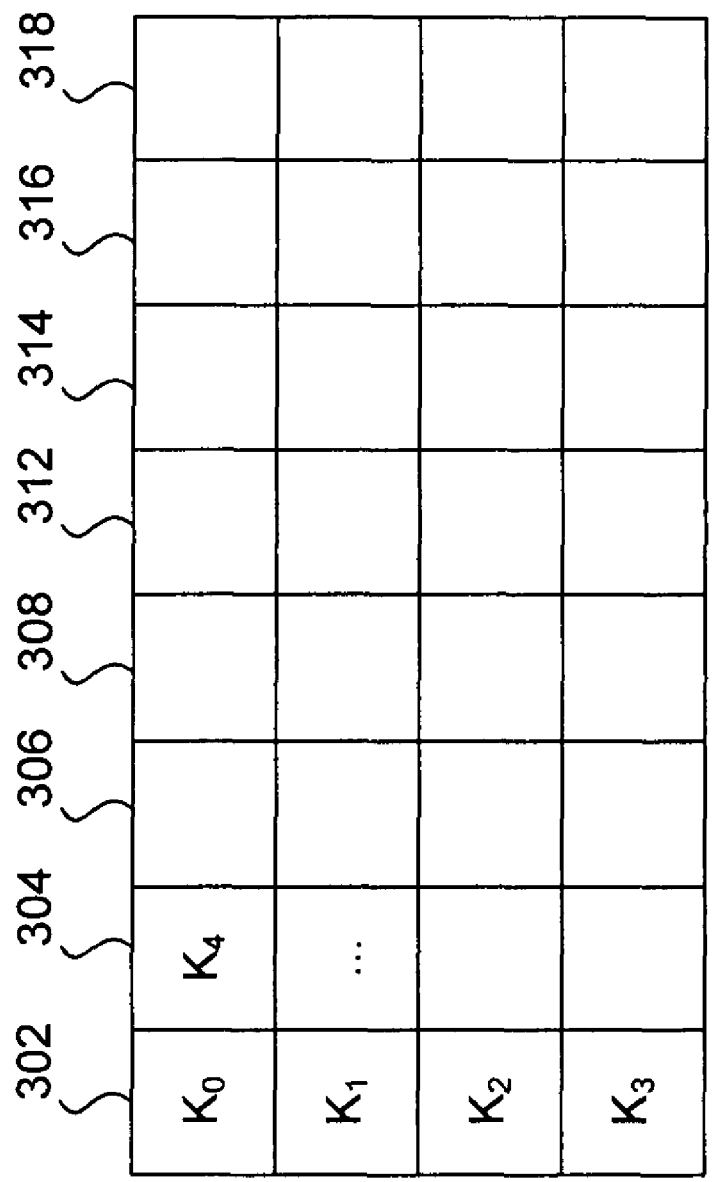
FIG. 3 illustrates an example of a 256-bit cipher key.

FIG. 3 illustrates an example of a 256-bit cipher key 182. A cipher key under the AES algorithm may be 128, 192 or 256 bits in length. The cipher key is the master key used to derive the different keys to be applied to a block during each round of the encryption operation. Each of these different keys are called round keys and each round key will be the same length as a block.

Control of the AES Core Architecture

Figure 4:
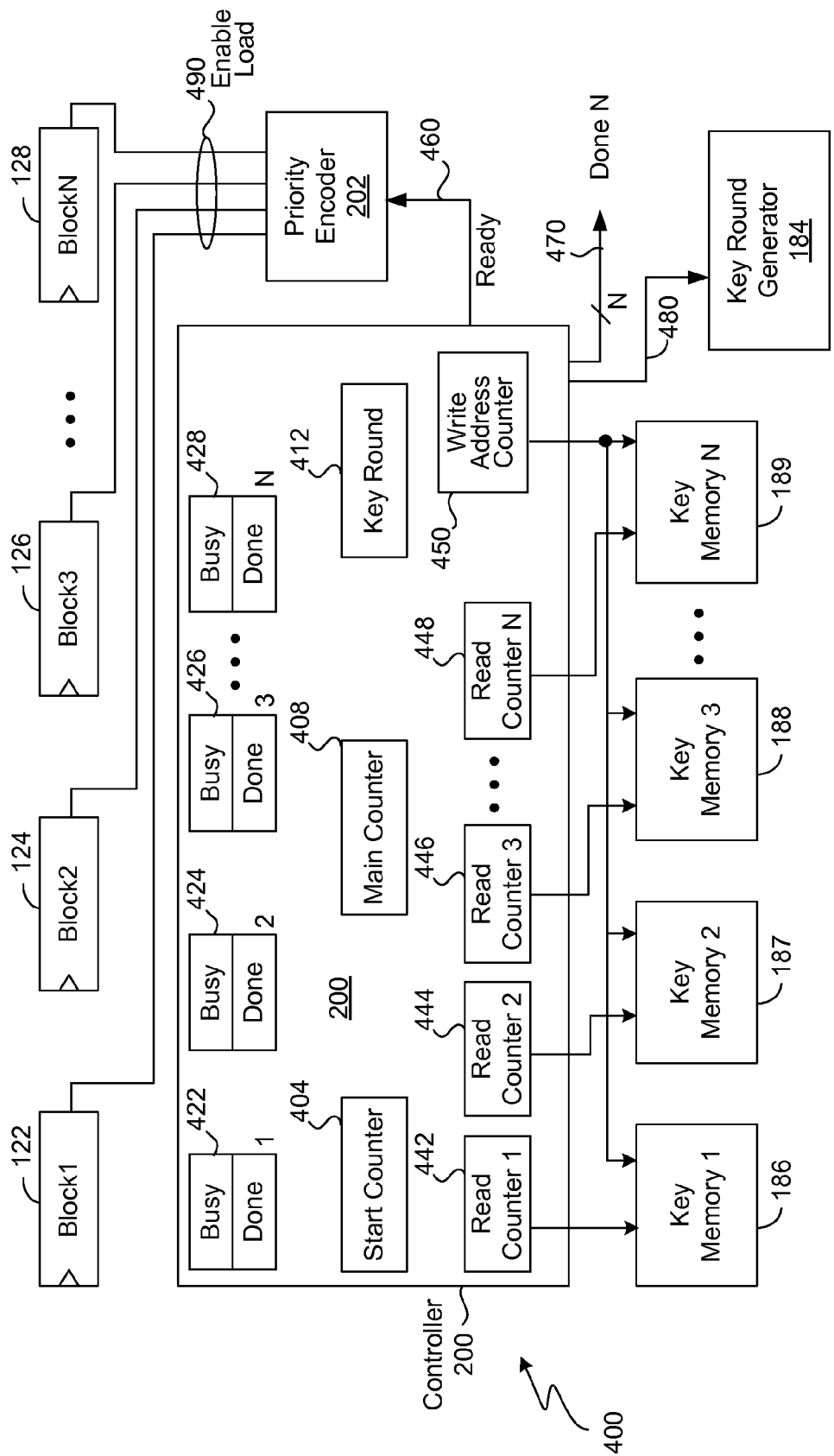
FIG. 4 illustrates a scheme for controlling the general AES core architecture according to one embodiment of the present invention.

FIG. 4 illustrates a scheme for controlling the AES core architecture according to one embodiment of the present invention. FIG. 4 illustrates the general case where there are N blocks of data to be encrypted, indexed 0 to N−1. Controller 200 includes several hardware counters, a start counter 404, a main counter 408, a key round counter 412, a write address counter 450 and N read counters 442 to 442+N−1. Also included are "busy" and "done" bits for each of blocks 122-128. For example, "busy" and "done" bits 424 correspond to block 124 and indicate if that block is still being encrypted or if it is done and ready to be output as ciphertext, respectively. Shown included are read counters 442-448 (in this example), each outputting an address to each of the key space memories 186-189 to indicate from which memory address in the memory a particular round key should be read for input to multiplexer 190. A single write address counter 450 is used to indicate at which memory location in each memory a particular round key from the key round generator should be written. The implementation of the above counters in hardware will be known to those skilled in the art.

Each key memory and its associated read counter corresponds to a single one of the blocks 122-128. In other words, memory 186 (for example) corresponds to block 122 and holds the 11 round keys that will be used to encrypt that block during its 11 rounds of encryption under the AES algorithm. Read counter 442 (for example) identifies which round key from which memory location in memory 186 should be used in the add round key unit 172 when block 122 is encrypted during a particular round.

A priority encoder hardware unit 202 receives a ready signal 460 from controller 200 when a block is finished being encrypted and uses one of the enable load signals 490 to enable one of the registers 122-128 to be loaded with the next available plaintext block. Unit 202 will load the register with the lowest index that is ready to be loaded.

Key round generator 184 receives information from the controller via signal lines 480. For example, the key round generator receives the key round increment signal and the generator then generates the next key block when it changes. The signal 490 "enable load to block 0" is also passed to the key round generator and resets the key round generator and starts a new key generation cycle.

FIG. 5 illustrates AES core architecture timing 500. FIG. 5 illustrates a specific example where there are 4 blocks of data to be encrypted, indexed 0 to 3. Main counter 408 of controller 200 is a counter that controls operation of the AES core; all individual operations are offset from this counter. Start counter 404 (modulo N) of controller 200 is a counter that controls the time slots available for each block 122-128. In this example, there are 5 blocks if 4 pipeline stages are used and 4 blocks for 3 pipeline stages, et cetera.

In this example, the blocks to be input to the pipeline 135 are block0, block1, block2 and block3. As such, start counter has four time slots 0, 1, 2 and 3; each time slot corresponding to one of the four blocks. For example, block 1 corresponds to time slot 1 because it is the second block. The time slot field 414 illustrates which blocks are associated with each time slot of the start counter.

Each block will cycle through its rounds independently of the other blocks. For example, if all blocks are loaded during the first key round time, then all will finish within one key round time. As each block can be loaded independently, block 2 may be loaded in key round 2. Depending on whether the load happened before or after the time slot reserved for block 2 in round 2, round 0 for block 2 will start in key round 2 or key round 3. Any block not loaded by the time block 0 completes all rounds will be ignored for that encryption cycle, and the next load will be to block 0 again. The function of key round counter 412 may be more of a logical implementation rather than physical. It is shown as a physical implementation for illustration. Incrementing the key round counter is used to clock key round generator 184.

Examples of Operation

As shown in FIG. 2, the core architecture includes four pipeline stages meaning that five simultaneous transformations may take place. In general, having N input blocks means that there will be N−1 pipeline stages.

Each encryption of a block of data under the AES algorithm will thus take 55 cycles (5 transformation steps*11 rounds), thus the average number of cycles to generate a new ciphertext from a plaintext block is the same, but the pipelining allows the system clock to run much faster. As described above, the AES core architecture includes a controller 200 with one write address counter 450 and N read counters 442-448. N refers to the number of simultaneous encryption operations supported and is indexed 0 to N−1.

The write counter 450 provides a write address in parallel to each memory, writing in the generated round key for that particular round into the memory location identified by the write counter. As mentioned, it is also possible to use a single circular buffer indexed by the write counter and all four read counters, since the round keys are the same for all blocks being encrypted.

Each read counter 442-448 starts in the key round for which processing starts for that block. For example, time slot 1 of the start counter corresponds to block 1. If block 1 is loaded when main counter=3, then the processing for block 1 will not start until main counter=5 because that is the next occurrence when time slot 1 is available. As such, the read counter for block 1 (read counter 444) would start off equal to 1 because that is the key round in which processing for block 1 begins.

For N simultaneous encryption operations (i.e., N blocks simultaneously undergoing encryption), processing of all blocks should be started before the $0^{th}$ one is finished in order to provide a speed advantage. If only the processing of some blocks is started, only these blocks can be encrypted simultaneously. Only one load into one of the registers 122-128 can occur per clock of the main counter, but multiple loads into these registers can occur per round. The controller 200 will ensure that processing for any block will only commence in its appropriate time slot (i.e., the start counter of FIG. 4).

The controller controls processing of a block as follows. The priority encoder will load the lowest indexed block that is available (i.e., both "busy" and "done" are "0"). Once a block is loaded, "busy" is set to "1." Once that block is finished, "done" is set to "1." Both "busy" and "done" are reset to "0" when that block is unloaded. If all blocks are unavailable ("busy" is "1") then a signal will be output (OR of all "busy" bits) in order to indicate that the core cannot accept data. This situation is described below with respect to the READY signal. This scheme will ensure that the correct blocks are loaded. The controller will kick off the read counter for a block when "busy" is "1" and the corresponding time slot comes up.

When the read counter for a particular block reaches 11 (in the case of a 128-bit cipher key where 11 rounds are used, different numbers apply in the case of 192-bit or 256-bit keys), then DONE 470 is asserted. DONE 470 will be asserted when the "done" bit for a particular register (for example, shown as bits 422-428) is set, indicating that the block corresponding to that register has finished being encrypted.

There are two main ways in which the AES core can be externally controlled, depending upon whether a single channel of data is being encrypted or whether multiple independent channels are being encrypted In the case where a single channel of data is being encrypted it is assumed that all operations are on data that is sequentially loaded and unloaded. A simple priority coding scheme is used to select the next plaintext block to be loaded into one of the registers 122-128. Each register has two bits associated with it, a "busy" bit and a "done" bit shown as 422-428. The controller outputs a READY signal 460 to the priority encoder 202 if any register is not busy ('0'); this means that the block previously associated with that particular register has finished being encrypted and has been output into register 204. The minimum time between each encryption block being completed is one clock, which means that register 204 must be read within one clock cycle.

An alternate way of handling the unloading of a completely encrypted block from the core is to read the encrypted block directly from registers 122-128. A priority encoder 202 will select the lowest indexed block that has its done bit set ('1') through a multiplexer. Inputs to the multiplexer are the contents of registers 122-128 and the output is ciphertext 210. Priority encoder 202 controls the multiplexer and has as inputs "done" bits 422-428 and an indication of which bits correspond to which register.

The priority encoder 202 will then enable the loading of the register with the lowest index having a busy bit equal to '0' via one of the enable load signals 490. Once the register is loaded, its "busy" bit is set to '1' because a block of data is present in that register that has not been fully encrypted.

For example, consider register 124. Register 124 may be loaded at any time it is available, i.e., its busy bit is '0'. As explained above, the priority encoder will ensure that the lowest indexed free block will be loaded next. The read counter 444 that controls this register will not start until a valid time slot for register 124 is available, namely main counter ticks 1, 5, 9, et cetera. In other words, read counter 444 will begin at the first time slot available for this register. Processing for the block in register 124 starts the next time the associated start counter 404 reaches a valid time slot. During these valid time slots, multiplexer 130 at the top of pipeline 135 selects register 124 holding the current state of that particular block and allows it to enter the pipeline. Once a block enters pipeline 135, processing using the N blocks and N-1 pipeline transformation steps of the AES algorithm occurs.

Regarding operation of the key round generator and the memories, the key round generator 184 outputs 11 round keys (one key for each of the 11 rounds), one round key being output every four ticks of the main counter (in the example of FIG. 5 where there are four registers and four blocks being simultaneously encrypted). A round key is input to each of the four parallel memories at the same time. In general, if there are N blocks, then every Nth tick of the main counter a new round key will be generated and written to the memories. For example, if there are 6 registers 122-128 (and therefore 6 blocks being simultaneously encrypted) then the next round key will be generated and written at the "0" tick and the "6" tick of the main counter. This timing scheme is necessary because, assuming that all 6 blocks are loaded and ready to be processed by pipeline 135, in 6 ticks of the main counter the last block will have crossed through unit 172 and the next block (the very first block) will be ready to enter unit 172 and will need the next round key.

Once the read counter for a particular block reaches the last round number (a value of 10 in the case where 11 rounds are used), the "done" bit (bit 422, for example) for that particular block is set to '1'. Setting this bit indicates that the encryption operation for that particular block is complete. The signal DONE 470 is set if any "done" bit is set.

In one particular embodiment unloading the encrypted block is controlled by the priority encoder 202 as well. The first register 122-128 that has a "done" bit set to '1' is unloaded. Once an unload occurs, the "busy" and "done" bits for that register are both reset to '0'. The block loaded into register 122 will be done first, and therefore unloaded first. Because of the priority coding scheme, this register 122 will be loaded the next time there is a load, so if any of the higher-indexed registers (i.e., any of registers 124-128) have not been loaded in that encryption cycle, they will not be used. If these registers have been loaded, processing will continue. This scheme guarantees that there will always be a monotonic relationship between the input blocks, and that valid key spaces will always be available for all encryption operations.

In one particular embodiment, the cipher key 182 may be changed at any time, but such a change will not take effect until the start of the encryption of the next block in register 122. The reason for this delayed effect is because the key round generator 184 will not accept a new cipher key until it has calculated the entire key space for the current cipher key, and this key space will be used for all other block indexes for that encryption cycle. The phrase "key space" is equivalent to a set of round keys. If a new key space is calculated for the first block, this new key space will not affect any other encryptions happening simultaneously, as these will use the previous cycle's key space, stored in the memories. As the cipher key is used in the loading of the data, the controller will output a signal "New Key" when the new cipher key can be loaded. This output will either be when the last round has been loaded, or when round one "DONE" is asserted (at which point processing will begin again with round 1). Preferably, the user should wait before changing keys until all data has rippled through the core if the user wants to have the new key take effect at a particular block.

An encryption cycle refers to the set of encryptions for blocks 0 ... N-1. A new cycle starts when the next block 0 is loaded. A cycle includes a single encryption (when a single block is loaded) or will include up to N encryptions, when there are N blocks loaded. A single encryption refers to a block of data being encrypted completely (i.e., all rounds) under the AES algorithm.

Now turning to the case where multiple independent channels of data are being encrypted, each block of data will have its own load, DONE, and unload signal. For example, each register 122-128 has its own associated DONE signal represented as an output DONE(N) from controller 200. Thus, the user (or any external device) of the core will know when to output a particular block and which registers may be loaded. The controller will ensure that no matter when a word is loaded, that it is not processed until its time slot. Unless emulating the operation of the automatic mode below, care is taken when changing keys.

Decryption Operation

Upon a reading of the above disclosure, one of skill in the art familiar with the AES algorithm will be able to implement a similar core architecture for decryption of ciphertext. Basically, the same architecture is used with the AES algorithm pipeline having its various processing units reversed. Thus, the first transformation step in the pipeline is the inverse of the "add round key" transformation, the second step is the "inverse mix columns" transformation, the third step is the "inverse shift rows" transformation, and the final step is the "inverse substitute bytes" transformation which uses an inverse S-Box. The key round generator basically runs in reverse. One technique would be to calculate all round keys first and then apply them in reverse order.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A hardware architecture for encrypting data using a symmetric-key encryption standard, said architecture comprising:
   N registers configured to store N blocks of data, each register arranged to hold a block of data;
   a multiplexer arranged to accept one of said N blocks of data at a time and to output said block;
   a pipeline processing unit arranged to perform a round of processing upon said block using said symmetric-key encryption standard, said pipeline processing unit receiving a round key for each round of processing upon said block;
   a key round generator that generates round keys for said pipeline processing unit using a cipher key;
   N key memory devices, each key memory device arranged to hold said round keys;
   N read counters each corresponding to one of said N key memory devices, each read counter indexing one of said round keys in a corresponding one of said N key memory devices to enable said indexed round key to be input to said pipeline processing unit; and
   a start modulo N counter configured to repeat a cycle of counting N times lots at each key round, wherein N is an integer greater than one.

2. The hardware architecture as recited in claim 1, further comprising:
   a controller including said N read counters, said controller further including a write address counter that indexes locations in said N key memory devices to enable said round keys to be written to said N key memory devices.

3. The hardware architecture as recited in claim 1, further comprising:
   N busy indicators, each busy indicator corresponding to one of said N registers, wherein each of said busy indicators indicates when the block of data in the corresponding register is being processed.

4. The hardware architecture as recited in claim 1, further comprising:
   an output of said pipeline processing unit that feeds a block of encrypted output data back into one of said N registers.

5. The hardware architecture as recited in claim 4, further comprising:
   a controller including said N read counters, said controller further including a write address counter that indexes locations in said N key memory devices to enable said round keys to be written to said N key memory devices, and wherein said controller further includes an enable load signal for each of said N registers in order to direct to where said output will be fed.

6. The hardware architecture as recited in claim 1, further comprising:
   a controller including said N read counters, said controller further including a write address counter that indexes locations in said N key memory devices to enable said round keys to be written to said N key memory devices, and wherein said controller further includes the start counter indicating a unique time slot for each of said N registers to input its respective block of data into said multiplexer.

7. The hardware architecture as recited in claim 2, further comprising:
   a priority encoder that receives a ready signal from said controller and outputs a N enable load signals that each instruct one of said N registers when to load a new block of data.

8. The hardware architecture as recited in claim 1, further comprising: an output of said pipeline processing unit that receives a block of encrypted output data.

9. The hardware architecture as recited in claim 1, wherein said N key memory devices are implemented in a single memory device, and wherein said N read counters are multiplexed into the read address input of said single memory device.

10. The hardware architecture as recited in claim 1, further comprising:
    a plurality of done indicators, each done indicator corresponding to one of said N registers, wherein each of said done indicators is set when the corresponding block has finished being encrypted, thus indicating that said corresponding register is ready to be reloaded with new input data.

11. The hardware architecture as recited in claim 1, further comprising:
    an unload priority encoder in communication with said controller arranged to control when one of said N registers may unload its corresponding block of data.

12. The hardware architecture of claim 1, wherein the N blocks of data include a first block of data and a second block of data, wherein the N registers include a first register configured to hold the first block and a second register configured to hold the second block, wherein a first of the N timeslots is allocated to process the first block and a second of the N timeslots is allocated to process the second block, wherein the first block is restricted from being processed during the second time slot and the first block is loaded into the first register after the occurrence of the first time slot.

13. The hardware architecture of claim 1, wherein the number N of registers is equal to the number N of key memory devices and the number N of read counters.

14. A method of encrypting data a symmetric-key encryption standard, said method comprising:
   loading N registers with N plaintext blocks of data, each register loaded with a plaintext block of data;
   selecting each block in turn to enter a pipeline processing unit arranged to perform a round of encryption upon said block using said symmetric-key encryption standard;
   generating a plurality of round keys necessary for a round of the symmetric-key encryption standard using a cipher key;
   storing said round keys in N key memory devices;
   indexing each of said N key memory devices with a read counter in order to output from each of said N key memory devices and into said pipeline processing unit one of said round keys for said round of encryption;
   repetitively counting, by a start modulo N counter, N timeslots at each key round, wherein N ranges is an integer greater than one;
   performing said round of encryption upon said block in said pipeline processing unit using said symmetric-key encryption standard; and
   outputting an encrypted version of said block from said pipeline processing unit.

15. The method as recited in claim 14, further comprising:
   outputting signals from a controller in order to perform said selecting and indexing, said controller including said read counters.

16. The method as recited in claim 14, further comprising:
   storing said round keys in said N key memory devices using a write address counter of ~ controller that indexes locations in said N key memory devices.

17. The method as recited in claim 14, further comprising:
setting a busy indicator for one of said N registers indicating that the block of data of said one of said N registers is being encrypted.

18. The method as recited in claim 14, further comprising:
   outputting from said pipeline processing unit a partially encrypted block of data; and feeding said encrypted block of data back into one of said N registers.

19. The method as recited in claim 18, further comprising:
   outputting said encrypted block of data to the one of said N registers in response to sending an enable load signal from a controlling device to the one of said N registers.

20. The method as recited in claim 14, further comprising:
   incrementing the start counter to indicate a unique time slot for each of said N registers to input its respective block of data into said pipeline processing unit.

21. The method as recited in claim 14, further comprising:
receiving a ready signal from a controller; and outputting a plurality of N enable load signals that each instruct one of said N registers when to load a new block of data.

22. The method as recited in claim 14, further comprising:
   outputting a block of encrypted data from said pipeline processing unit, said block of encrypted data being completely encrypted using said ABS algorithm symmetric-key encryption standard.

23. The method as recited in claim 14, wherein said N key memory devices are implemented in a single memory device, and wherein said N read counters are multiplexed into the read address input of said single memory device.

24. The method as recited in claim 14, further comprising:
   setting a done indicator for one of said N registers indicating when the block of data of said one of said N registers has finished being encrypted and said one of said N registers is ready to be reloaded with new input data.

25. The method as recited in claim 14, further comprising:
receiving an indication from said controller at an unload priority encoder that one of said N registers is holding an encrypted block of data; and controlling an unload multiplexer to output said encrypted block of data.

26. The method of claim 14, wherein the number N of registers is equal to the number N of key memory devices.

27. A hardware architecture for encrypting data using the a symmetric-key encryption standard, said architecture comprising:
   N registers configured to store N blocks of data, each register arranged to hold a block of data;
   a multiplexer arranged to accept one of said N blocks of data at a time and to output said block;
   encryption means for performing a round of encryption upon said block using said symmetric-key encryption standard, said block being received from said multiplexer;
   a key round generator that generates round keys for said encryption means using a cipher key;
   N key memory devices, each key memory device arranged to hold said round keys; and controller
   indexing one of said round keys in a corresponding one of said N key memory devices; and
   enabling said indexed round key to be input to said encryption means, wherein said controller includes modulo N counting a cycle of N timeslots at each key round, wherein N is an integer greater than one.

28. The hardware architecture as recited in claim 27, further comprising:
   N read counters of said controller, said N read counters being used to index said N key memory devices.

29. The hardware architecture as recited in claim 27, further comprising:
   a plurality of N busy indicators, each busy indicator corresponding to one of said N registers, wherein each of said busy indicators indicates when the block of data in the corresponding register is being encrypted.

30. The hardware architecture as recited in claim 27, further comprising:
   an output of said encryption means that feeds a block of encrypted output data back into one of said N registers.

31. The hardware architecture as recited in claim 30, further comprising:
   a plurality of N read counters of said controller, and wherein said controller further includes an enable load signal for each of said N registers in order to direct to where said output will be fed.

32. The hardware architecture as recited in claim 27, wherein said means for counting indicating a unique time slot for each of said N registers to input its respective block of data into said multiplexer.

33. The hardware architecture as recited in claim 27, further comprising:
   a priority encoder that receives a ready signal from said controller and outputs N enable load signals that each instruct one of said N registers when to load a new block of data.

34. The hardware architecture as recited in claim 27, further comprising: an output of said encryption mains that receives a block of encrypted output data.

35. The hardware architecture as recited in claim 27, wherein said encryption means receives a round key for each round of processing upon said block.

36. The hardware architecture as recited in claim 27, wherein said N key memory devices are implemented in a single memory device, and wherein said controller is multiplexed into the read address input of said single memory device.

37. The hardware architecture as recited in claim 27, further comprising:

N done indicators, each done indicator corresponding to one of said N registers, wherein each of said done indicators is set when the corresponding block has finished being encrypted, thus indicating that said corresponding register is ready to be reloaded with new input data.

38. The hardware architecture as recited in claim 27, further comprising:

an unload priority encoder in communication with said controller means arranged to control when one of said N registers may unload its corresponding block of data.

39. The hardware architecture of claim 27, wherein the number N of registers is equal to the number N of key memory devices.

* * * * *